United States Patent [19]

Baugh et al.

[11] Patent Number: 4,593,399

[45] Date of Patent: Jun. 3, 1986

[54] METHOD AND APPARATUS FOR MAXIMIZING EFFICIENCY IN SATELLITE COMMUNICATIONS

[75] Inventors: Charles R. Baugh; Edwin J. Hilpert, both of Plantation, Fla.; George R. Kushin, New Port, R.I.; Yoon B. Park, North Boro, Mass.; William A. Dambrackas, Miami, Fla.

[73] Assignee: Racal Data Communications Inc., Sunrise, Fla.

[21] Appl. No.: 493,144

[22] Filed: May 9, 1983

[51] Int. Cl.⁴ .................................................. H04S 15/00
[52] U.S. Cl. .................................. 375/104; 179/170.2
[58] Field of Search ............... 375/76, 82, 92, 94, 375/99, 104; 370/32, 104; 179/170.2, 170.4, 170.6; 455/12

[56] References Cited

U.S. PATENT DOCUMENTS

| | | |
|---|---|---|
| 3,560,669 | 2/1971 | Foulkes .......................... 179/170.2 |
| 3,647,993 | 3/1972 | Foulkes et al. ................. 179/170.2 |
| 4,177,361 | 12/1979 | Birck ............................. 179/170.2 |
| 4,352,962 | 10/1982 | La Mothe ...................... 179/170.2 |
| 4,355,406 | 10/1982 | Guidoux ............................ 375/94 |
| 4,394,767 | 7/1983 | Shum .............................. 179/170.2 |

*Primary Examiner*—Robert L. Griffin
*Assistant Examiner*—Stephen Chin
*Attorney, Agent, or Firm*—Jerry A. Miller

[57] ABSTRACT

In a data communication system involving modems transmitting over a link including terrestrial and one or more satellite links, a nontransmitting modem sends a secondary channel tone during the absence of data transmission. The cessation of said tone is detected by the other modem and used to de-squelch the remote modem receiver. In this manner, the receiver is protected from echoes impinging upon it during long transmission delay times. This method optimizes data throughput by adapting to the transmission delay of the circuit.

8 Claims, 3 Drawing Figures

METHOD AND APPARATUS FOR MAXIMIZING EFFICIENCY IN SATELLITE COMMUNICATIONS

BACKGROUND OF THE INVENTION

The subject invention relates to data communications and more particularly to a method and apparatus for increasing data transmission efficiency in networks employing turnaround transmission through a combination of terrestrial and satellite facilities. The disclosed embodiment relates to a system employing modems transmitting in a half duplex mode through telephone line and satellite facilities.

In such systems transmission delays on the order of 700 milliseconds or greater may be encountered. Such delays allow for undesirable generation of echoes which can interfere with data transmission. In the prior art, it has been the custom to disallow data transmission for extended periods necessary to assure noninterference by echoes. This has been accomplished by squelching the modem receiver for a fixed period of time, regardless of the actual transmission delay. Such delays introduce serious inefficiencies in data transmission capacity. The prior art has also been unable to cope with the problem of spurious echoes in multiple satellite environments.

SUMMARY OF THE INVENTION

It is therefore an object of the invention to improve the data transmission capacity of data communication systems employing satellite links.

It is a further object of the invention to provide a method and apparatus which effectively eliminates problems created by echoes without impeding data transmission efficiency.

It is an additional object to achieve the foregoing objects in a data communication system employing half duplex modems and terrestrial and satellite communication links.

These and other objects and advantages which will be apparent are achieved according to the invention by provision of out-of-band tones transmitted in the absence of data. Receiver squelching is removed at the receiver when the receiver detects tone cessation. The removal of receiver squelching is thereby synchronized with the arrival of data, thus eliminating reception of echoes. Importantly, the technique is adaptive in the sense that proper squelch timing is achieved regardless of the number of satellite links or other delay elements in the transmission path.

BRIEF DESCRIPTION OF THE DRAWINGS

The just-summarized invention will now be described in detail in conjunction with the drawings of which

DETAILED DESCRIPTION OF THE PREFERRED EMBODIMENT

Figure 1:
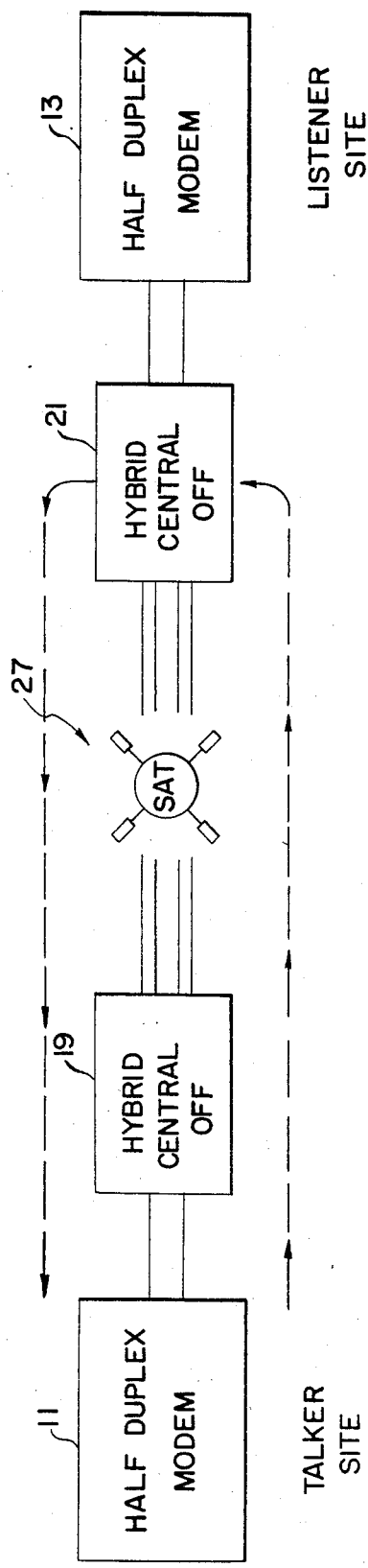
FIG. 1 illustrates a data transmission system wherein the preferred embodiment of the invention finds application.

FIG. 1 illustrates a data communication system employing the preferred embodiment of the invention. This system includes first and second modems 11, 13 operating in half duplex mode. These modems 11, 13 are indicated as being located respectively at a talker's site and at a listener's site. Each modem 11, 13 is connected by a respective two-wire connection 15, 17 to a respective hybrid 19, 21. The hybrids 19, 21 are typically located at telephone office local sites (central offices). As known in the prior art, the hybrids 19, 21 adapt the signals on connectors 15, 17 to four-wire transmission over respective terrestrial line pairs 23, 25. The terrestrial transmission lines lead to satellite communication facilities 27. Such facilities may include one or more satellites and associated delay times. In addition, various portions of the circuits shown as terrestrial line pairs 23, 25 may comprise microwave or other terrestrial facilities. The subject invention will prove to be adaptive in the sense that the receiver squelch circuit compensates for the echoes caused by transmission delays regardless of duration of the delays or the number or nature of the facilities involved.

As known to those skilled in the art, reflections caused by the hybrid 21 at the listener site create an echo of the talker transmission which occurs at the receiver of the talker site modem. In a wholly terrestrial communication system, techniques are known for controlling this echo. However, when satellite transmission is used, delays in round trip transmission time of 700 milliseconds or more occur. Such delays allow echo return from hybrid 21 to become a factor in data transmission. Although echo suppression or cancellation circuitry may be in the network, there is no guarantee that such will be the case. In the absence of such circuitry, the echo return is likely to precede the data and be misinterpreted by the modem receiver.

Figure 2:
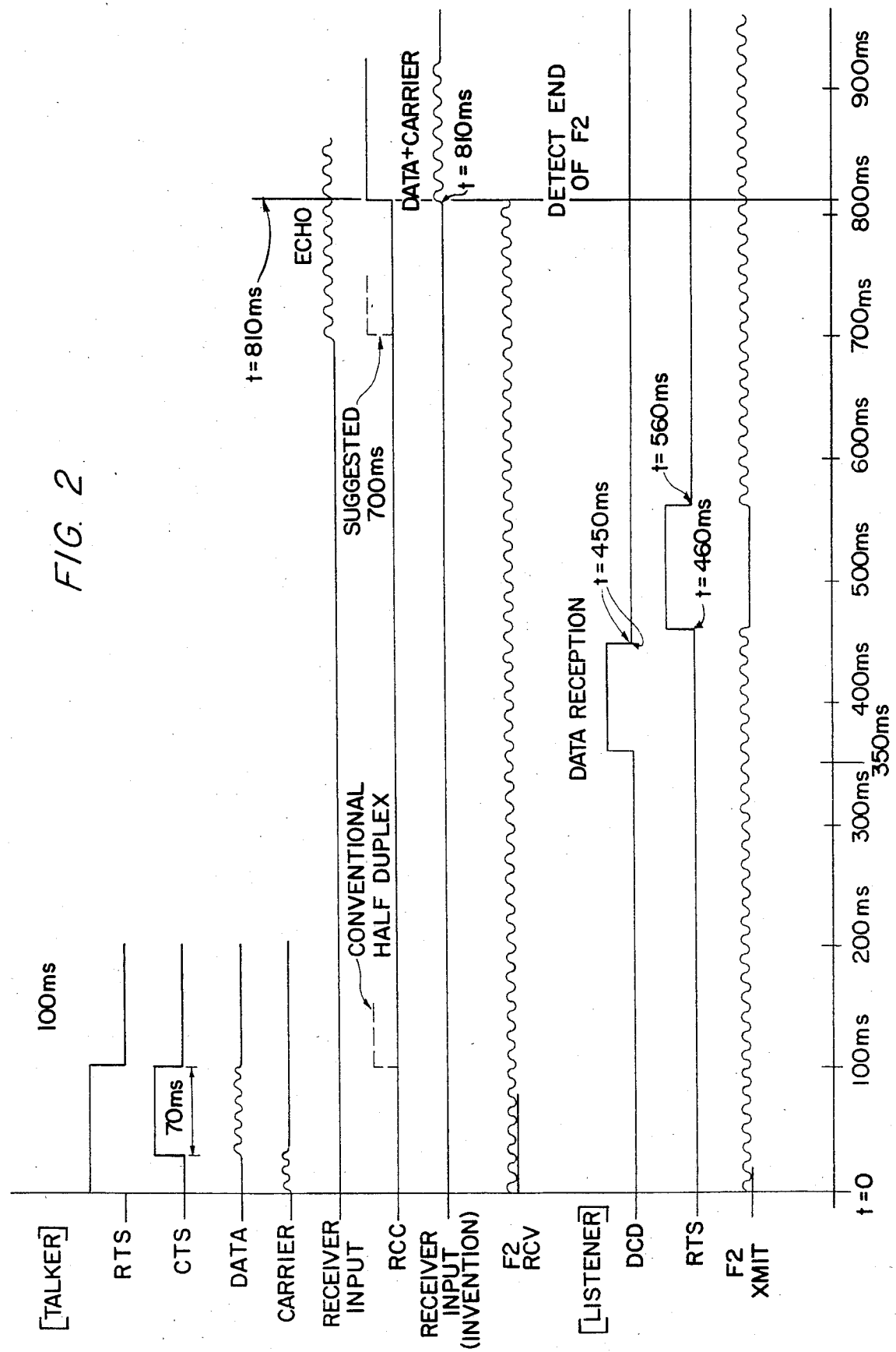
FIG. 2 is a waveform timing diagram useful in description of the preferred embodiment.

This problem is illustrated more rigorously by the timing diagrams in FIG. 2. At a point in time designated $t_o$, RTS (request to send) is raised at the talker modem 11. A short interval thereafter the talker modem raises clear to send (CTS) and data transmission by the modem 11 begins. In the example shown, a 70 millisecond (ms) block of data is assumed to be sent, and RTS, CTS and data transmission cease 100 ms after $t_o$.

Since the one way transmission delay with one satellite link is 350 ms, receipt of the carrier and data block transmitted by the talker modem 11 occurs 350 ms later at the listener modem 13. Data carrier detect (DCD) is thus raised at the listener modem shortly after $t=350$ ms and terminates after reception of the data block.

After reception is completed, the terminal or other apparatus at the listener modem 13 may raise its RTS to transmit a block of data to the talker site modem 11. Again, assuming an RTS interval of 100 ms, the carrier and succeeding data block transmitted by the listener modem 13 arrives at the talker modem 350 msec after transmission or at $t=810$ ms. At this point, DCD at the receiver of the talker modem 11 should come on.

As will be noted, prior to the receipt of the listener modem message, the talker modem receiver is receiving the echo of the message originally transmitted by the talker modem, which arrives at $t=700$ ms. This echo causes erroneous reception by the receiver of the talker modem 11.

In prior art half duplex modems, an RCC signal is employed to squelch the modem receiver while data is being transmitted. RCC of the talker modem is shown in FIG. 2 with dotted lines representing conventional and suggested approaches to control of RCC.

The RCC signal conventionally comes up when data transmission (and RTS) terminate. This operation permits the spurious echo at t=700 ms to enter the talker receiver.

It has also been suggested that RCC be controlled to come up at a fixed time such as 700 ms after the end of transmission in modems used in satellite transmission to alleviate the echo problem. However, such a fixed time can delay data transmission when roundtrip transmission delays are short. It further fails to work when several satellites are involved because the round trip delay time thus becomes several multiples of 700 ms.

According to the preferred embodiment, these problems are eliminated by circuitry which turns RCC on substantially concurrently with the reception of data, regardless of varying delay times between talker and listener modem. RCC is thus timed to come up when remote carrier comes in.

Figure 3:
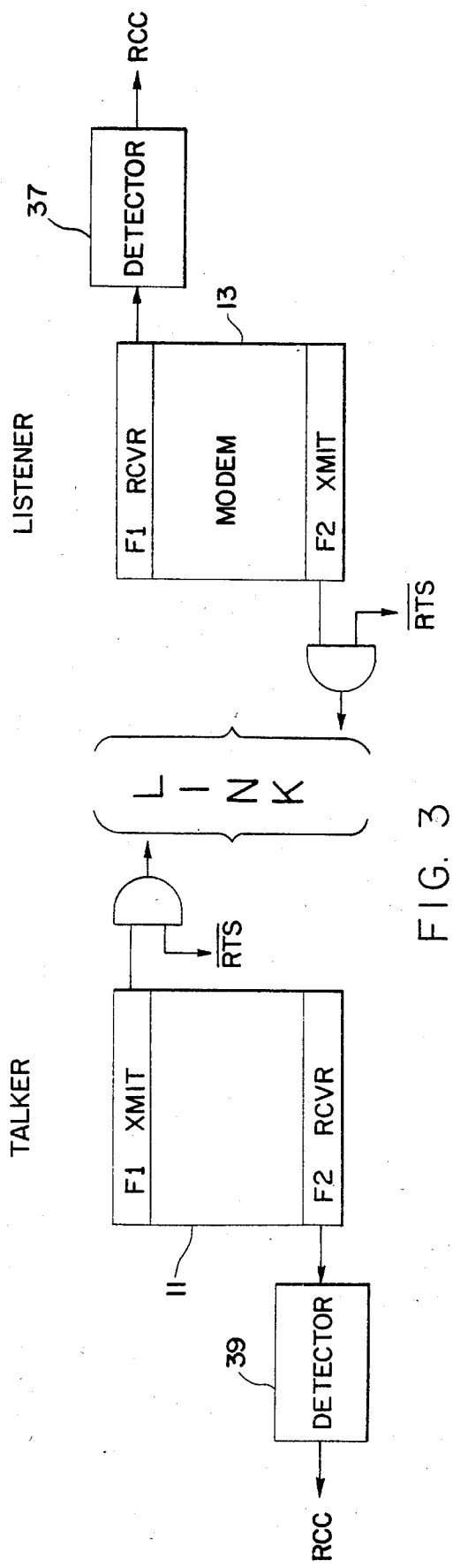
FIG. 3 is a schematic diagram of circuitry for implementing the preferred embodiment.

According to FIG. 3, each modem 11, 13 is provided with an out-of-band frequency transmitter and receiver. The talker modem 11 is provided with a transmitter transmitting a tone of frequency $F_1$ and a receiver adapted to receive a tone of frequency $F_2$. The listener modem 13 is provided with a transmitter for transmitting a tone of the frequency $F_2$ and a receiver for receiving the tone at frequency $F_1$. $F_1$ and $F_2$ may be chosen as 390 Hz and 450 Hz, respectively. Other frequencies of course may be used. As known to those skilled in the art, such frequencies may be detected despite data transmission over the modem's main channel. The use of different talker and listener frequencies assures that the talker modem will not react to the echo of its own $F_1$ frequency and vice versa. The construction of such transmitters and receivers is well known to those skilled in the art.

Further according to the preferred embodiment, the tone $F_1$ is sent upon termination of RTS by the talker modem 11 and is terminated upon raising of RTS at the talker modem 11. Similarly, transmission of tone $F_2$ is enabled upon termination of RTS at the listener modem 13 and is disabled upon raising of RTS at the listener modem 13. The control of transmission of these frequencies in response to RTS may be accomplished by simple logic such as AND gates 31, 33 supplied with the inverted RTS signal $\overline{RTS}$. It should be noted that it is possible to control $F_1$ and $F_2$ by other signals to achieve the results of the invention.

The technique used to activate RCC according to the preferred embodiment is to detect the termination of frequencies $F_1$ and $F_2$. More specifically, with reference to FIG. 2, while the talker modem 11 is transmitting its 70 msec data message to the listener modem 13, the listener modem's secondary channel transmitter is on and the talker modem's secondary channel receiver is receiving the $F_2$ frequency tone. RCC is held off at the talker modem 11 during reception of $F_2$ by the talker modem 11. When RTS comes up at the listener modem 13, $F_2$ terminates. In practice, $F_2$ may be terminated slightly before RTS or RTS slightly delayed. Thus, when carrier reception occurs at the talker modem 11 (talker DCD goes up), $F_2$ has died out sufficiently that its termination has been detected. RCC is raised in response to detection of the termination of $F_2$. Since $F_2$ has been transmitted from the same end as the arriving data, it experiences the same delay as the data and therefore properly times raising of RCC regardless of the number of satellite links or other delay-causing elements in the link.

Similarly, detection of cessation of the $F_1$ tone is used to raise RCC at the appropriate time at the listener modem 13. The termination of the $F_1$ and $F_2$ tones may be detected by threshold detectors 37, 39 or by other means well known to those skilled in the art.

Many modifications and adaptions of the preferred embodiment will be apparent to those skilled in the art from the subject disclosure. Therefore, it is to be understood that, within the scope of the appended claims, the invention may be practiced other than as specifically described herein.

What is claimed is:

1. A method of eliminating echo interference in half-duplex data transmission between a first local modem and a second remote modem separated by a variable tranmission delay interval over telephone line and satellite facilities between said remote/local modem, said local modem including means responsive to a signal for squelching its receiver, said method comprising the steps of:
    sending a tone from the remote modem to the local modem during the absence of data transmission to the local modem, said tone being at a frequency which is detectable by the local modem despite the presence on the channel of the data signal;
    terminating said tone substantially at the beginning of data transmission from said remote modem to said local modem;
    detecting, at said local modem, the termination of said tone; and
    removing said signal from said means for squelching in response to detection of said termination, thereby enabling the receiver of said local modem to receive data.

2. The method of claim 1 wherein said tone is sent by said remote modem upon cessation of a request to send signal RTS and terminated upon raising of the request to send signal RTS at said remote modem.

3. Apparatus for eliminating echo interference in a half-duplex data transmission system over telephone lines and satellite facilities and employing local and remote modems, said local modem including means responsive to a control signal for squelching the local modem data receiver, said apparatus comprising:
    means for transmitting a first signal from said remote modem to said local modem during absence of data transmission by said remote modem to said local modem, said first signal being detectable by said local modem regardless of the presence of a data signal on the transmission path; and
    means for detecting the termination of said first signal and responsive to said detection to remove said control signal, thereby enabling the receiver of said local modem to receive data.

4. The apparatus of claim 3 wherein said means for transmitting sends out said first signal substantially upon lowering of a request to send signal RTS at said remote modem and terminates said first signal substantially upon the raising of the request to send signal RTS at said remote modem.

5. The apparatus of claim 3 or 4 wherein transmission at a carrier rate by said local modem begins substantially upon raising of a request to send signal RTS at the local modem and terminates substantially upon lowering of the request to send signal RTS at the local modem.

6. The apparatus of claim 3 wherein said first signal is a tone of single frequency.

7. The apparatus of claim 4 wherein said first signal is a tone of single frequency.

8. In a data modem, the apparatus comprising:
a data receiver for receiving data;
means for transmitting upon cessation of data transmission by said modem a tone of a first frequency;
means for receiving and detecting a tone of a second frequency;
means responsive to a control signal for squelching the data receiver of said modem and responsive to the absence of said control signal for enabling said data receiver for data transmission; and
means responsive to cessation of receipt of said tone of second frequency for removing said control signal so as to enable said data receiver.

* * * * *